(12) United States Patent
Wu et al.

(10) Patent No.: US 12,265,239 B2
(45) Date of Patent: Apr. 1, 2025

(54) WIDE ANGLE APPLICATION HIGH REFLECTIVE MIRROR

(71) Applicant: II-VI DELAWARE, INC., Wilmington, DE (US)

(72) Inventors: Li Wu, Fujian (CN); Zhe Liu, Fujian (CN); Guanglong Yu, Fujian (CN); Yu Li, Fujian (CN); Yan Su, Fujian (CN); Zhiqiang Lin, Fujian (CN)

(73) Assignee: II-VI DELAWARE, INC., Wilmington, DE (US)

( * ) Notice: Subject to any disclaimer, the term of this patent is extended or adjusted under 35 U.S.C. 154(b) by 1110 days.

(21) Appl. No.: 17/259,439

(22) PCT Filed: Sep. 12, 2018

(86) PCT No.: PCT/CN2018/105140
§ 371 (c)(1),
(2) Date: Aug. 2, 2021

(87) PCT Pub. No.: WO2020/015101
PCT Pub. Date: Jan. 23, 2020

(65) Prior Publication Data
US 2021/0356633 A1    Nov. 18, 2021

(30) Foreign Application Priority Data
Jul. 18, 2018    (CN) .......................... 201810792202.2

(51) Int. Cl.
*G02B 5/08*    (2006.01)
*G02B 1/10*    (2015.01)

(52) U.S. Cl.
CPC .............. *G02B 5/0875* (2013.01); *G02B 1/10* (2013.01); *G02B 5/0883* (2013.01)

(58) Field of Classification Search
CPC ...... G02B 1/10; G02B 5/0825; G02B 5/0833; G02B 5/0875; G02B 5/0883; G02B 5/208; G02B 5/281; G02B 5/282
(Continued)

(56) References Cited

U.S. PATENT DOCUMENTS 6,572,975 B2    6/2003    Dalakos
7,583,443 B2    9/2009    Zaczek
(Continued)

FOREIGN PATENT DOCUMENTS

CN    102112897 A    6/2011
CN    103094390 A    5/2013
(Continued)

OTHER PUBLICATIONS

International Search Report and Written Opinion in PCT Appl. PCT/CN2018/105140, dated Apr. 15, 2019.
(Continued)

*Primary Examiner* — Ricky D Shafer
(74) *Attorney, Agent, or Firm* — Blank Rome LLP

(57) ABSTRACT

Provided is a wide angle application high reflective mirror having a reflection band partially overlapping in a wavelength range of 800-4000 nm. The mirror comprises a film system in which a plurality of high refractive index film layers and a plurality of low refractive index film layers that are alternately stacked, and the material of the high refractive index film layer is one of SiH, $SiO_xH_y$, or $SiO_xN_y$, or a mixture thereof. The highly reflective mirror can achieve a reflectance greater than 99% with an incident angle ranging from 0 to 60 degrees over a large angle range.

9 Claims, 3 Drawing Sheets

(58) Field of Classification Search
USPC ....... 359/359, 360, 584, 588, 589, 838, 883, 359/884
See application file for complete search history.

(56) References Cited

U.S. PATENT DOCUMENTS

| | | | |
|---|---|---|---|
| 9,588,269 | B2 | 3/2017 | Hendrix et al. |
| 10,408,981 | B2 | 9/2019 | Yoshihara et al. |
| 11,131,794 | B2* | 9/2021 | Hendrix ............... G01J 5/0802 |
| 2003/0039847 | A1* | 2/2003 | Dalakos ............... C23C 16/24 |
| | | | 428/448 |
| 2010/0182709 | A1 | 7/2010 | Ishida et al. |
| 2011/0096391 | A1* | 4/2011 | Kanai ............... G02B 5/0825 |
| | | | 359/359 |
| 2014/0014838 | A1 | 1/2014 | Hendrix et al. |
| 2018/0217299 | A1 | 8/2018 | Takahashi |
| 2021/0255377 | A1* | 8/2021 | Liu ............... C23C 14/3464 |

FOREIGN PATENT DOCUMENTS

| | | |
|---|---|---|
| CN | 104369440 A | 2/2015 |
| CN | 106324731 A | 1/2017 |
| CN | 106324732 A | 1/2017 |
| CN | 108873135 A | 11/2018 |
| JP | 2005501286 A | 1/2005 |
| JP | 2006317603 A | 11/2006 |
| JP | 2007310335 A | 11/2007 |
| JP | 2010055058 A | 3/2010 |
| JP | 2016012559 A | 1/2016 |
| JP | 2017161897 A | 9/2017 |
| JP | 6302688 B2 | 3/2018 |
| JP | 2018100390 A | 6/2018 |
| JP | 2018106961 A | 7/2018 |
| WO | 03019244 A1 | 3/2003 |
| WO | 2010004954 A1 | 1/2010 |
| WO | 2014014930 A3 | 3/2014 |
| WO | 2014084167 A1 | 6/2014 |
| WO | 2017051795 A1 | 3/2017 |
| WO | 2020103206 A1 | 5/2020 |

OTHER PUBLICATIONS

Office Action issued in Japanese Patent Application No. 2021-525341 on Aug. 4, 2022 and machine translation.
Translation of Chinese Office Action issued in Chinese Patent Application No. 201810792202.2 on May 7, 2022.

* cited by examiner

WIDE ANGLE APPLICATION HIGH REFLECTIVE MIRROR

FIELD OF THE INVENTION

The present invention relates to the field of optical lenses, and more particularly, to a wide angle application high reflective mirror.

BACKGROUND

Reflective mirrors are one of the most widely used devices in the field of optical communications, imaging, instrumentation and sensing. For such reflective mirrors, an objective of increasing reflective light is often achieved by coating one or multiple layers of materials on a particular substrate by using vacuum film-plating techniques.

Conventionally, to meet the needs of wide angle application, reflective mirrors are required to be coated with metallic film layers. However, the metallic film belongs to "soft films", and has the disadvantages of low abrasion resistance, poor environmental reliability, and short lifetime. Even if a single or multiple hard dielectric thin films are added as an enhanced protective layers (for example, a hard dielectric oxide layer such as $Nb_2O_5$, $Ta_2O_5$, $Al_2O_3$, or $SiO_2$) to improve reliability, there is still a large reliability gap with the conventional all-dielectric thin film. On the other hand, if conventional oxide or fluoride all-dielectric materials, such as $TiO_2$, $Nb_2O_5$, $Ta_2O_5$, $SiO_2$, and mixtures thereof, are used, the mirror will have excellent environmental reliability and lifetime, but it will suffer the disadvantage of significant shift of the center wavelength of the reflection band to the short wave while the incident angle increases, and finally cannot be used over a wide range of incident angles.

In view of the above problems, the present invention discloses some technical improvements, which improves the range of incident angles of the conventional reflective mirrors, and at the same time, ensures its good reliability and lifetime.

SUMMARY OF THE INVENTION

The objective of the present invention is to provide highly reflective mirror for wide angle application. The invention improves the range of incident angles of the conventional mirrors, and at the same time ensures its good reliability and lifetime.

In order to achieve the above purpose, the present invention adopts the following technical solutions:

a wide angle application high reflective mirror having a reflection band partially overlapping in a wavelength range of 800 to 4000 nm, wherein the reflective mirror comprises: a plurality of high refractive index film layers and a plurality of low refractive index film layers alternately stacked; the material of the high refractive index film layer is SiH, SiOxHy, or SiOxNy, or a mixture thereof, and each of the high refractive index film layers has a refractive index of greater than 3 in a wavelength range of 800 to 4000 nm. The reflection band has a reflectance of greater than 99% with an incident angle ranging from 0 to 60 degrees over a large angle range.

Preferably, the high refractive index film layer has a refractive index of greater than 3.5 in a wavelength range of 800 to 1100 nm.

Preferably, the material of the low refractive index film layer is one or a mixture of two or more of $TiO_2$, $Nb_2O_5$, $Ta_2O_5$, $SiO_2$, SixNy.

Preferably, it further comprises a metal film layer located on the innermost side of the film system, and the metal layer is one or a mixture of two or more of Cr, Ta, Ti, Nb, Ni, Au, Ag, Cu, Al.

It further comprises a substrate for carrying a film system, and the substrate material is one or a mixture of two or more of a silicon material, silica-based glass, plastic, sapphire, silicon carbide, and tempered glass.

The present invention adopts the above technical solution to have the following beneficial effects: to realize a reflection band partially overlapping with a wavelength range of 800 to 4000 nm, the reflection band has a reflectance of greater than 99% in an incident angle range of 0 to 60 degrees. Preferably, the reflection band has a reflectance of greater than 99% in an incident angle range of 0 to 80 degrees.

BRIEF DESCRIPTION OF THE DRAWINGS

The present invention will be further described in detail below with reference to the accompanying drawings and specific embodiments.

DETAILED DESCRIPTION OF THE INVENTION

The invention will be further described below in combination with embodiments and comparative examples.

Figure 1:
FIG. 1 is a schematic diagram of a structure of the present invention.

As shown in FIG. 1, a wide angle application high reflective mirror of the present invention has a reflection band partially overlapping in a wavelength range of 800 to 4000 nm, where the reflective mirror includes: a plurality of high refractive index film layers 1 and a plurality of low refractive index film layers 2 alternately stacked; the material of high refractive index film layers 1 is SiH, SiOxHy, or SiOxNy, or a mixture thereof, and each of the high refractive index film layers 1 has a refractive index of greater than 3 in a wavelength range of 800 to 4000 nm. The reflection band has a reflectance of greater than 99% with an incident angle ranging from 0 to 60 degrees over a large angle range.

The high refractive index film layer 1 has a refractive index of greater than 3.5 in the wavelength range of 800 to 1100 nm.

The material of the low refractive index film layer 2 is one or a mixture of two or more of $TiO_2$, $Nb_2O_5$, $Ta_2O_5$, $SiO_2$, SixNy.

The film layer further includes a metal film layer located on the innermost side of the film system, and the metal layer is one or a mixture of two or more of Cr, Ta, Ti, Nb, Ni, Au, Ag, Cu, Al.

The high reflective mirror further includes a substrate for carrying a film system, and the substrate material is one or a mixture of two or more of a silicon material, silica-based glass, plastic, sapphire, silicon carbide, and tempered glass.

Embodiment 1

Figure 2:
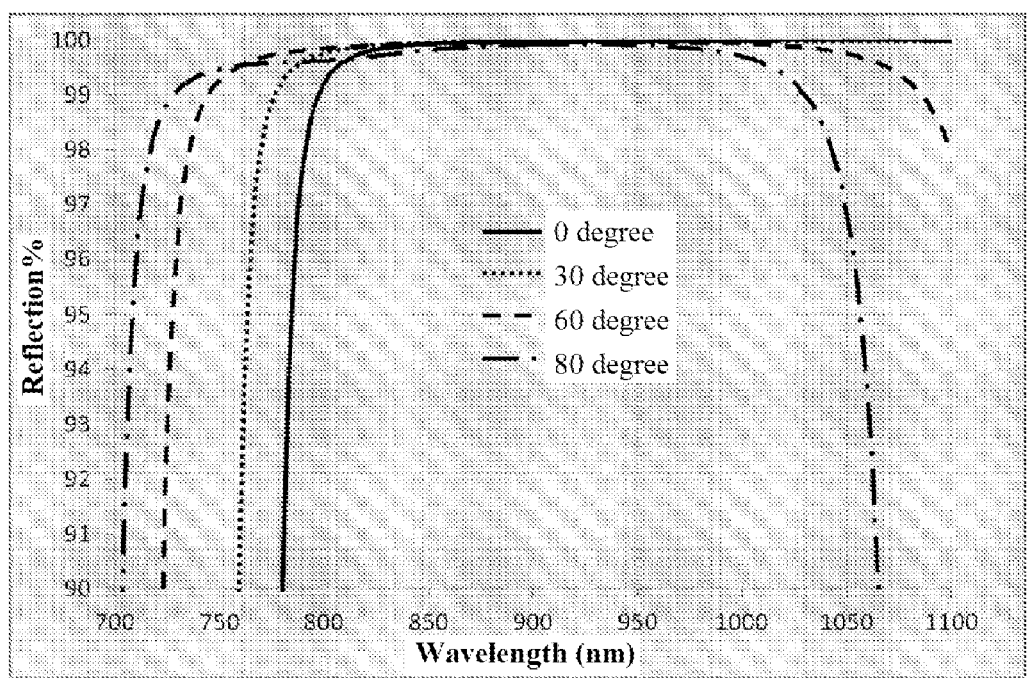
FIG. 2 is a diagram of a relationship between of a reflectance and a wavelength according to Embodiment 1 of the present invention.
Figure 3:
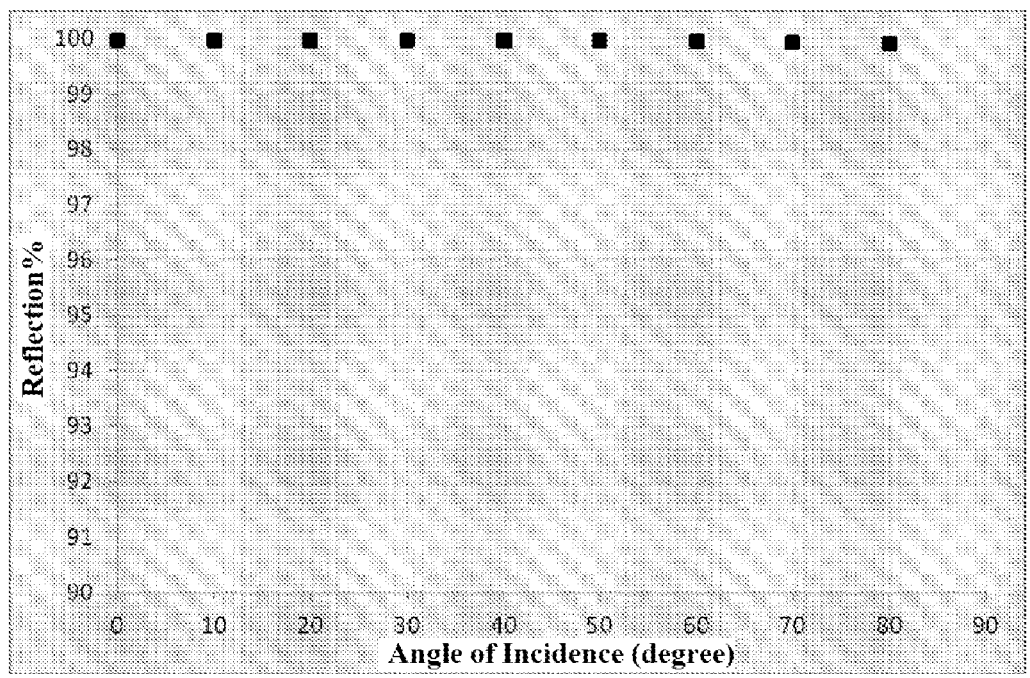
FIG. 3 is a diagram of a relationship between an average reflectance of a reflection band and an incident angle according to Embodiment 1 of the present invention.

As shown in one of FIG. 1 to FIG. 3, a wide angle application high reflective mirror has a high reflection band in a range of 850 to 950 nm, and the structure thereof includes: a film system formed by a plurality of high refractive index film layers 1 and a plurality of low refractive index film layers 2 that are alternately stacked.

The material of the high refractive index film layer is SiH, and the refractive index thereof near 900 nm is 3.6.

The material of the low refractive index film layer is $SiO_2$, and the refractive index thereof near 900 nm is 1.48.

The material of the substrate is a common K9 optical glass.

The reflection band of the present invention has a reflectance of greater than 99% with an incident angle ranging from 0 to 80 degrees. Furthermore, it can meet the reliability requirements of abrasion resistance, and high temperature and high humidity resistance of communications and automotive products. FIG. 2 is a diagram of a relationship between of a reflectance and a wavelength according to Embodiment 1.

Comparative Example 1

A wide angle application high reflective mirror has a high reflection band in the range of 850 nm to 950 nm, and the band contains a gold film.

The material of the substrate is a common K9 optical glass.

Figure 4:
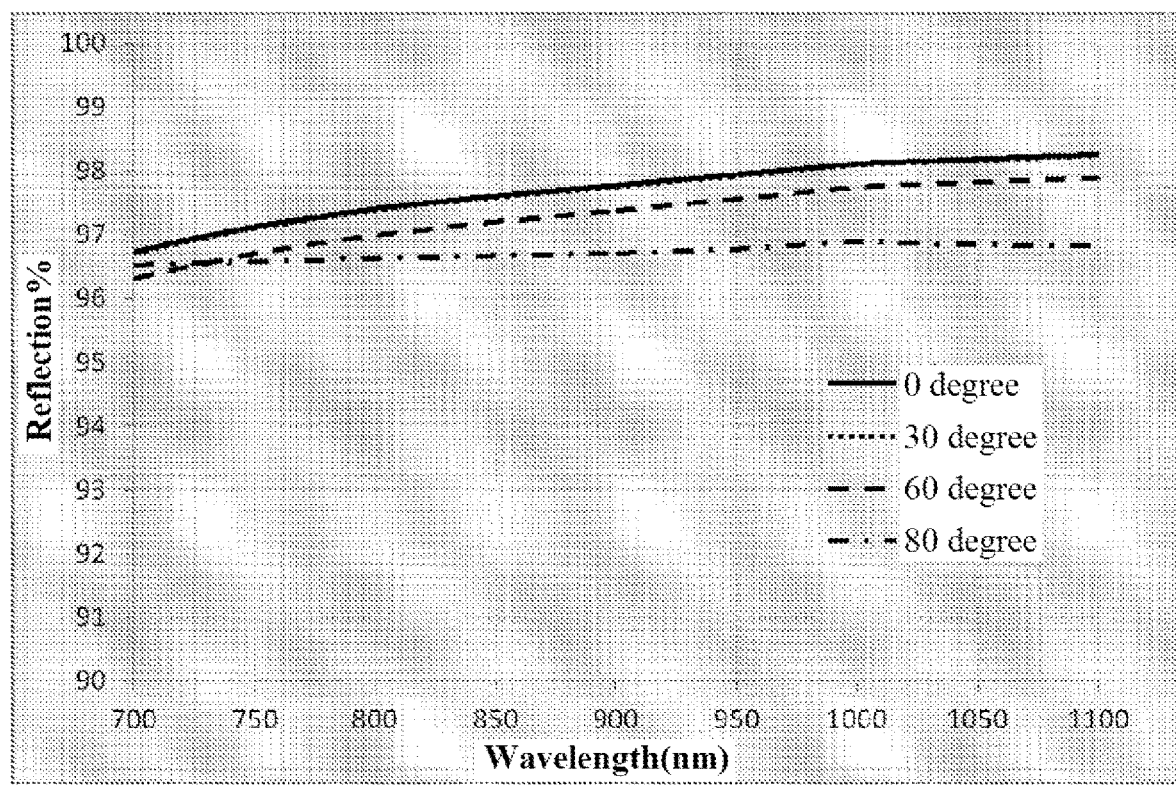
FIG. 4 is a diagram of a relationship between of a reflectance and a wavelength according to Comparative Example 1 of the present invention.
Figure 5:
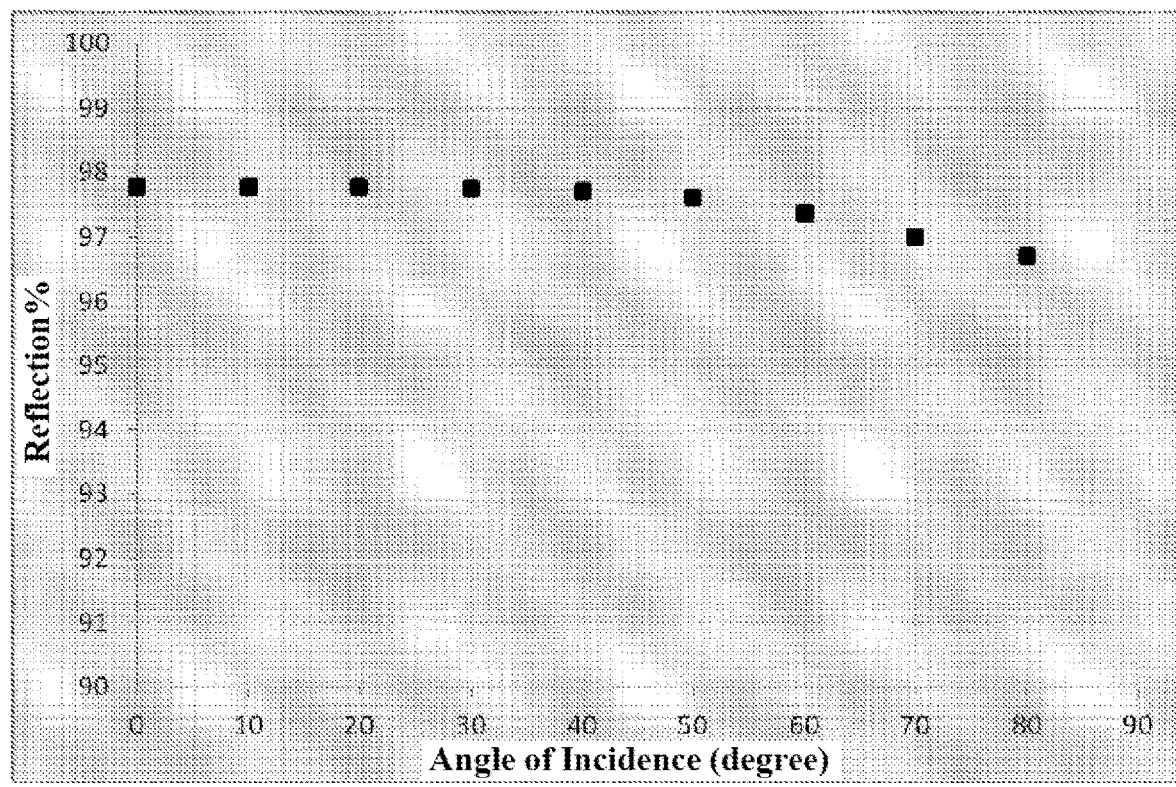
FIG. 5 is a diagram of a relationship between an average reflectance of a reflection band and an incident angle according to Comparative Example 1 of the present invention.

Performance comparison is made between the reflective mirrors of Embodiment 1 and Comparative Example 1:

As shown in FIG. 4 and FIG. 5, the target reflection band of Comparative Example 1 can satisfy application of an incident angle of approximately 0 to 85 degrees. The high reflection band of Comparative Example 1 has a reflectance of greater than 96% with an incident angle ranging from 0 to 80 degrees.

The lower reflectance increases the loss of an optical path and reduces the signal-to-noise ratio of an optical system. Moreover, exposing the gold film material to the air will make the reflective mirror less resistant to moisture, humidity, and abrasion, and will not meet the needs of harsh environments.

Comparative Example 2

A wide angle application high reflective mirror has a high reflection band in the range of 850 nm to 950 nm, and the structure thereof includes a plurality of high refractive index film layers and a plurality of low refractive index film layers which are alternately stacked.

The material of the high refractive index film layer is $TiO_2$, and the refractive index thereof near 900 nm is 2.25.

The material of the low refractive index film layer is $SiO_2$, and the refractive index thereof near 900 nm is 1.48.

The material of the substrate is a common K9 optical glass.

Figure 6:
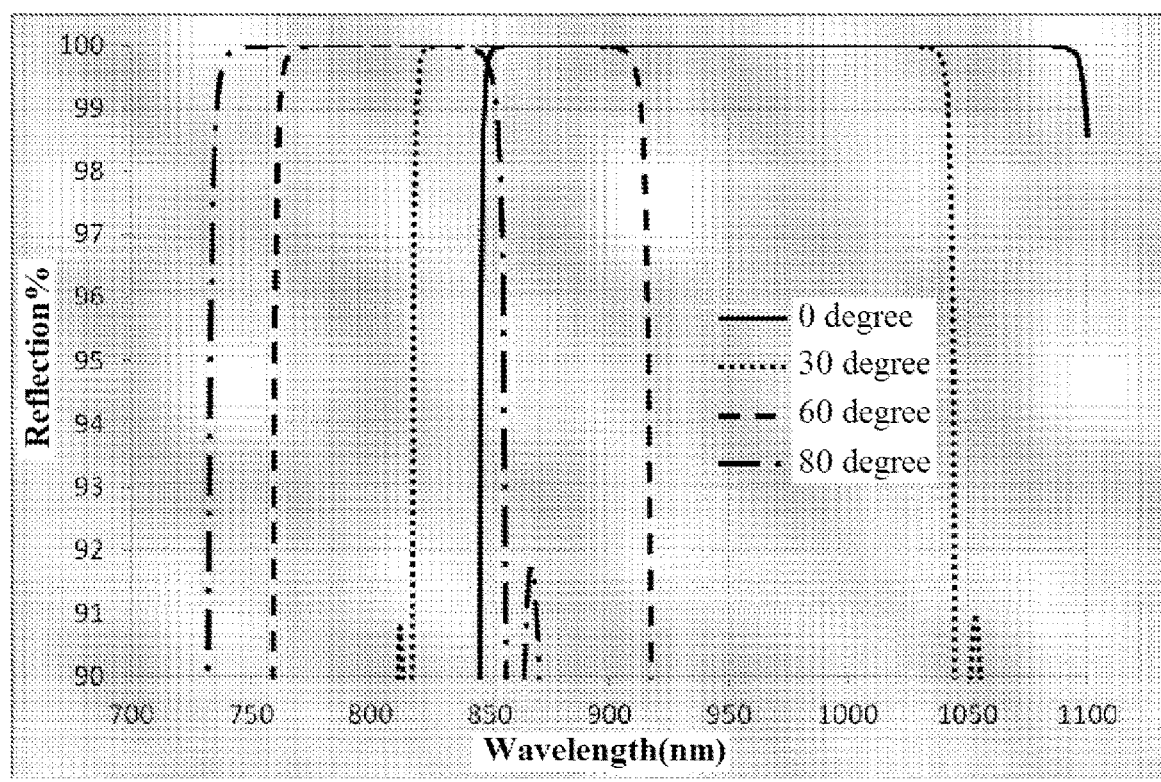
FIG. 6 is a diagram of a relationship between of a reflectance and a wavelength according to Comparative Example 2 of the present invention.
Figure 7:
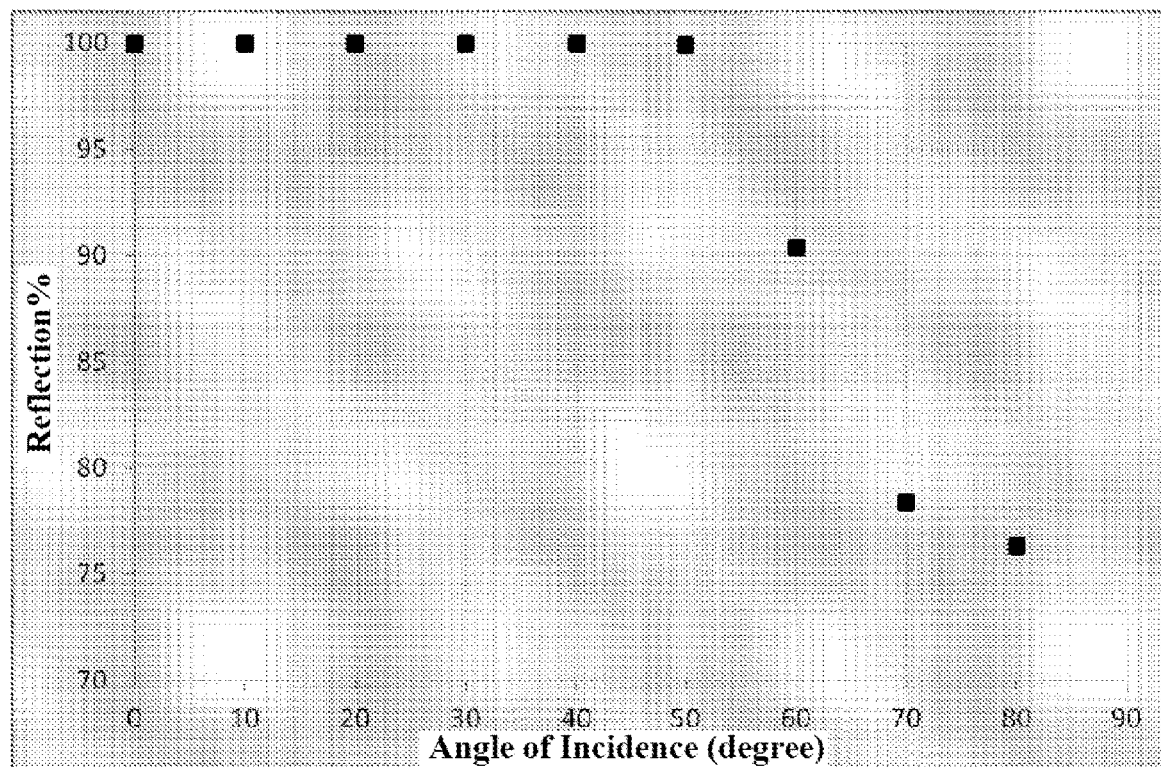
FIG. 7 is a diagram of a relationship between an average reflectance of a reflection band and an incident angle according to Comparative Example 2 of the present invention.

Performance comparison is made between the reflective mirrors of Embodiment 1 and Comparative Example 2:

As shown in FIG. 6 and FIG. 7, in Comparative Example 2, >99% reflectance at the target reflection band can be achieved, but meeting this reflectance can only limit the application angle from 0 to about 50 degrees. As the incident angle increases, the overall shape of the film system shift in the short-wavelength direction, and the reflectance deteriorates significantly in the application range of 50-80 degrees.

The small range of incident angles limits its application to optical systems with great field of view. Systems based on this reflective mirror cannot be used for occasions of large angle incidence.

The invention claimed is:

1. A wide angle application high reflective mirror having a reflection band partially overlapping in a wavelength range of 800 to 4000 nm, wherein the high reflective mirror comprises:
   a plurality of high refractive index film layers and a plurality of low refractive index film layers alternately stacked, a material of the high refractive index film layers includes one of (i) SiOxHy or SiOxNy, or (ii) a mixture at least two of SiH, SiOxHy, or SiOxNy
   wherein each of the plurality of high refractive index film layers has a refractive index of greater than 3 in the wavelength range of 800 to 4000 nm and the reflection band has a reflectance of greater than 99% within the wavelength range of 850 to 950 nm with an incident angle ranging from 0 to 60 degrees over a large angle range.

2. The wide angle application high reflective mirror according to claim 1, wherein the refractive index of each of the plurality of high refractive index film layers is greater than 3.5 in a wavelength range of 800 to 1100 nm.

3. The wide angle application high reflective mirror according to claim 1, wherein a material of the plurality of low refractive index film layers is one of (i) $TiO_2$, $Nb_2O_5$, $Ta_2O_5$, $SiO_2$, and SixNy and (ii) a mixture of two or more of $TiO_2$, $Nb_2O_5$, $Ta_2O_5$, $SiO_2$, and SixNy.

4. The wide angle application high reflective mirror according to claim 1, further comprising a metal film layer comprising one of (i) Cr, Ta, Ti, Nb, Ni, Au, Ag, Cu, and Al and (ii) a mixture of two or more of Cr, Ta, Ti, Nb, Ni, Au, Ag, Cu, and Al.

5. The wide angle application high reflective mirror according to claim 1, further comprising a substrate upon which the plurality of high refractive index film layers and the plurality of low refractive index film layers are formed.

6. The wide angle application high reflective mirror according to claim 5, wherein wherein the substrate includes a material comprising one of (i) a silicon material, silica-based glass, plastic, sapphire, silicon carbide, and tempered glass and (ii) a mixture of two or more of silicon material, silica-based glass, plastic, sapphire, silicon carbide, and tempered glass.

7. The wide angle application high reflective mirror according to claim 1, wherein each of the plurality of low refractive index film layers has a refractive index of 1.48 at 900 nm.

8. The wide angle application high reflective mirror according to claim 1, further comprising a metal film layer comprising one of (i) Cr, Ta, Ti, Nb, Ni, and Cu, and (ii) a mixture of two or more of Cr, Ta, Ti, Nb, Ni, Au, Ag, Cu, and Al.

9. The wide angle application high reflective mirror according to claim 1, wherein the reflection band has a reflectance of greater than 99% in an incident angle range of 0 to 80 degrees.

* * * * *